United States Patent [19]

Altermatt

[11] 3,865,805
[45] Feb. 11, 1975

[54] AZO COMPOUNDS HAVING A 2-NITRO-4-PHENYLSULFAMOYLDIPHE- NYL AMINE NUCLEUS

[76] Inventor: Ruedi Altermatt, Hauptstrasse 65, Tecknau, Basel-Land, Switzerland

[22] Filed: Dec. 2, 1971

[21] Appl. No.: 204,382

Related U.S. Application Data

[63] Continuation of Ser. No. 851,444, Aug. 19, 1969, abandoned.

[30] Foreign Application Priority Data

Aug. 30, 1968 Switzerland.................... 13051/68
Dec. 19, 1968 Switzerland.................... 18944//68
Dec. 19, 1968 Switzerland.................... 18943/68

[52] U.S. Cl................. 260/205, 260/152, 260/156, 260/155, 260/157, 260/158, 260/160, 260/162, 260/163, 260/174, 260/176, 260/193, 260/196, 260/206, 260/207, 260/207.1, 260/556 N, 8/26, 8/41 B, 8/41 C, 8/50

[51] Int. Cl...................... C09b 43/00, C09b 43/12

[58] Field of Search ........ 260/205, 206, 207, 207.1, 260/207.5, 207.3, 196

[56] References Cited
UNITED STATES PATENTS

| | | | |
|---|---|---|---|
| 2,879,269 | 3/1959 | Merian............................ | 260/205 X |
| 3,516,982 | 6/1970 | Dimroth et al. .................. | 260/206 |
| 3,535,306 | 10/1970 | Altermatt et al. ............... | 260/207.1 |
| 3,663,531 | 5/1972 | Liechti............................. | 260/207 X |

FOREIGN PATENTS OR APPLICATIONS 345,096   4/1960   Switzerland....................... 260/205

*Primary Examiner*—Lorraine A. Weinberger
*Assistant Examiner*—C. F. Warren
*Attorney, Agent, or Firm*—Gerald D. Sharkin; Richard E. Vila; Melvyn M. Kassenoff

[57] ABSTRACT

Compounds of the formula

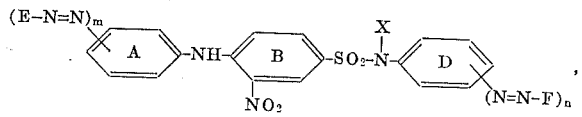

wherein
E is phenyl, substituted phenyl, naphthyl, methylsulfonylnaphthyl, thiazolyl, substituted thiazolyl, benzothiazolyl, substituted benzothiazolyl, pyrazolyl, substituted pyrazolyl, 4-carbamoylimidazolyl, 4-phenyl-1,3,5-thiadiazolyl, thienyl, quinolyl or tetrazolyl,
F is phenyl, naphthyl, thiazolyl, benzothiazolyl, pyrazolyl, imidazolyl, thiadiazolyl, thienyl, quinolyl, tetrazolyl,or 1-anilino-1,3-dioxobutyryl-2, or a substituted derivative thereof,
X is hydrogen, alkyl or substituted alkyl,
$m$ is 0 or 1, and
$n$ is 0 or 1,
with the proviso that m + n is 1 or 2, and wherein Rings A, B and D may bear additional substituents. These compounds are outstandingly suitable for dyeing and printing fibres consisting of synthetic or semi-synthetic, hydrophobic organic compounds of high molecular weight, and of textile materials manufactured with these fibres.

15 Claims, No Drawings

AZO COMPOUNDS HAVING A 2-NITRO-4-PHENYLSULFAMOYLDIPHENYL AMINE NUCLEUS

This application is a continuation of application Ser. No. 851,444, filed Aug. 19, 1969, and now abandoned. The new compounds have the general formula

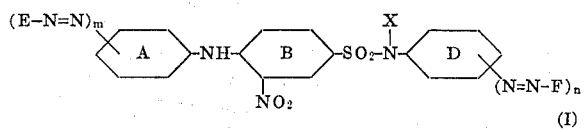

where,

E stands for a phenyl radical which may be substituted by chlorine or bromine atoms, lower alkyl, lower alkoxy, trifluoromethyl, nitro, cyano, thiocyano, phenoxy, formyl, acetyl, benzoyl, lower alkylsulphonyl, lower hydroxyalkylsulphonyl, benzylsulphonyl, aminosulphonyl, methylaminosulphonyl, cyanoethylaminosulphonyl, hydroxyethylaminosulphonyl, phenylaminosulphonyl, formylamino, lower alkanoylamino, chloropropionylamino, lower alkylsulphonylamino, lower alkoxycarbonyl, benzyloxycarbonyl, lower alkoxycarbonylamino, aminocarbonyl, lower alkylaminocarbonyl or phenylaminocarbonyl groups; a naphthalene radical which may be substituted by a methylsulphonyl group; a thiazole radical which may be substituted by chlorine or bromine atoms, methyl, methoxy, nitro, methylsulphonyl or trifluoromethyl groups; a benzothiazole radical which may be substituted by chlorine or bromine atoms, or a nitro, cyano, methylsulphonyl, methoxy, trifluoromethyl, aminosulphonyl, lower alkylaminosulphonyl; hydroxyethylaminosulphonyl or a methoxypropylaminosulphonyl group; a pyrazole radical which may be substituted by methyl, benzyl or phenyl groups; a 4-aminocarbonylimidazole radical, a 4-phenylthiadiazole-(1,3,5)-radical, a thiophene radical, a quinoline radical or a tetrazole radical;

F for a phenyl, naphthyl, thiazolyl, benzothiazolyl, pyrazolyl, imidazolyl, thiadiazolyl, thienyl, quinolyl, tetrazolyl or acetoacetic acid anilide radical which may be substituted;

X for a hydrogen atom or an optionally substituted alkyl group;

m for 0 or 1 and n for 0 or 1, where the sum of m and n is at least 1; and where the rings A, B and D may bear further substituents and the molecule is free from sulphonic acid groups.

In preferable dyestuffs of formula (I), the symbols have the following meanings:

E stands for a phenyl radical which may be substituted by chlorine or bromine atoms, lower alkyl, lower alkoxy, trifluoromethyl, nitro, cyano, thiocyano, phenoxy, formyl, acetyl, benzoyl, lower alkylsulphonyl, lower hydroxyalkylsulphonyl, benzylsulphonyl, cyanoethylaminosulfonyl (cyanoethylsulfamoyl), N-hydroxyethylaminosulfonyl (N-hydroxyethylsulfamoyl), phenylaminosulfonyl (phenylsulfamoyl), formylamino (formamido) lower alkanoylamino, chloropropionylamino (chloropropionamido), lower alkylsulphonylamino, lower alkoxycarbonyl, benzyloxycarbonyl, lower alkoxycarbonylamino, aminocarbonyl (carbamoyl), lower alkylaminocarbonyl (alkylcarbamoyl) or phenylaminocarbonyl (phenylcarbamoyl) groups; a naphthalene radical which may be substituted by a methylsulphonyl group; a thiazole radical which may be substituted by chlorine or bromine atoms, methyl, methoxy, nitro, methylsulphonyl or trifluoromethyl groups; a benzothiazole radical which may be substituted by chlorine or bromine atoms, nitro, cyano, methylsulphonyl, methoxy, trifluoromethyl, aminosulphonyl, lower alkylaminosulphonyl, hydroxyethylaminosulphonyl or a methoxypropylaminosulphonyl group; a pyrazole radical which may be substituted by methyl, benzyl or phenyl groups; a 4-aminocarbonylimidazole radical; a 4-phenylthiadiazole-(1,3,5) radical; a thiophene radical, a quinoline radical or a tetrazole radical;

F for a phenyl radical which may be substituted by chlorine or bromine atoms, lower alkyl, lower alkoxy, phenoxy, trifluoromethyl, thiocyano, cyano, nitro, hydroxyl, formyl, acetyl, benzoyl, lower alkylsulphonyl, hydroxyethylsulphonyl, benzylsulphonyl, aminosulphonyl, lower alkylaminosulphonyl, cyanoethyl sulfamoyl, hydroxyethylaminosulphonyl, phenylaminosulphonyl, lower alkylamino, cyanethylamino, formylamino, lower alkanoylamino, chloropropionylamino, methylsulphonylamino, lower alkoxycarbonyl, benzyloxycarbonyl, lower alkoxycarbonylamino, aminocarbonyl, lower alkylaminocarbonyl or phenylaminocarbonyl groups; a naphthalene radical which may be substituted by a methylsulphonyl group; a benzothiazole radical which may be substituted by chlorine or bromine atoms or a nitro, cyano, methylsulphonyl, methoxy, trifluoromethyl, aminosulphonyl, methylaminosulphonyl, ethylaminosulphonyl, hydroxyethylaminosulphonyl or methoxypropylaminosulphonyl group; a pyrazole radical which may be substituted by lower alkyl, hydroxyl, amino, carboxylic acid amide or phenyl groups: a 4-aminocarbonylimidazole radical: a 4-phenylthiadiazole-(1,3,5) radical; a thiophene radical; a quinoline radical; a hydroxyquinoline radical; a tetrazole radical or an acetoacetic acid anilide radical;

X for a hydrogen atom or a lower alkyl group which may be substituted by chlorine or bromine atoms, hydroxyl, cyano, lower alkanoyloxy, benzoyloxy, lower alkoxycarbonyloxy, lower alkoxycarbonyl, aminocarbonyl, benzyloxycarbonyloxy, lower alkoxy, phenoxy, pyridyl, methylaminocarbonyloxy (methylcarbamoyloxy) or phenylaminocarbonyloxy (phenylcarbamoyloxy) groups;

m for 0 or 1 and n for 0 or 1, where the sum of m and n is at least 1; the ring A may bear as substituents chlorine or bromine atoms, lower alkyl, lower alkoxy, formylamino, lower alkanoylamino, benzoylamino, lower alkoxycarbonylamino, benzyloxycarbonylamino or chloropropionylamino groups; the ring B may bear a further nitro group; the ring D may bear chlorine or bromine atoms, lower alkyl, lower alkoxy, phenoxy, hydroxyl, cyano, nitro, thiocyano, hydroxyethoxy, lower alkanoyloxyethoxy, formylamino, lower alkanoylamino, benzoylamino, lower alkylsulphonyl, benzylsulphonyl, phenylsulphonyl, aminosulphonyl, lower alkylaminosulphonyl, acetyl, benzoyl, aminocarbonyl, lower alkylaminocarbonyl, methoxypropylaminocarbonyl groups or a group of the formula $$-CH_2-O-CH_2-O-$$

The term "lower" indicates that the respective groups contain 1, 2, 3 or 4 carbon atoms.

The azo compounds of the formula (I) are produced by condensation of one mole of a compound of formula

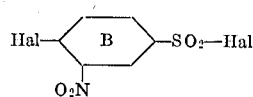

(II), where Hal represents a chlorine or bromine atom, with one mole of an amine of formula

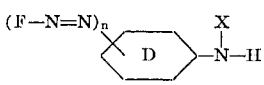

(III)

and one mole of an amine of the formula

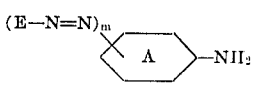

(IV).

The condensation reaction is generally conducted in an inert solvent, e.g. water, ethanol, n-butanol, benzyl alcohol, ethylene glycol, polyethylene glycol, benzene, toluene, xylene, chlorobenzene etc., at temperatures in the range of 25°C to 200°C. It is usually of advantage to include an acid-binding agent in the reaction mixture, e.g. alkali, carbonates, bicarbonates or acetates, magnesium oxide or calcium oxide.

Since the halogen atom attached to the $SO_2$- group in the compound of formula (II) is more highly reactive than the halogen atom bound to the nucleus, the first noted amine of formula (III) is bound to the $SO_2$- group while the amine of formula (IV) is subsequently bound directly to the nucleus B. It is desirable to effect the first stage of the reaction at a temperature below 100°C and the second stage in the range of about 80°C to 200°C, employing an autoclave if necessary.

A second mode of operation for producing compounds of formula (I) is to melt one mole of a compound of the formula

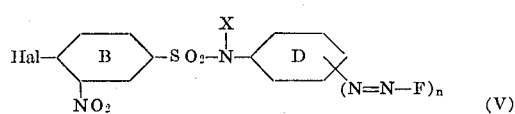

(V)

and one mole of an amine of formula (IV) and to condense the two in the presence of one of the aforenamed acid-binding agents at a suitable temperature between 100°C and 220°C A further synthetic route to compounds of formula (I) consists in condensing one mole of a compound of the formula

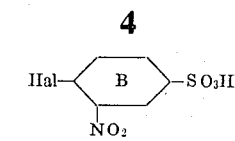

(VI)

and one mole of an amine of formula (IV), converting the resulting compound with a halogenating agent, e.g. phosphorus trichloride or thionyl chloride, into the sulphonic acid chloride of formula

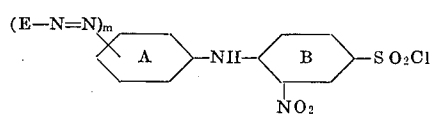

(VII)

and condensing this with one mole of an amine of formula (III). Here the condensation reaction of the compound of formula (VI) with the amine of formula (IV) is carried out, preferably in one of the aforenamed solvents, at temperatures in the range of about 30°C to 200°C, whilst the condensation of the compound of formula (VII) with the amine of formula (III) is effected preferably in the same medium in the range of 25°C to 130°C.

A further method of production yielding compounds of formula (I) in which n=1 consists in the diazotization of a compound of formula

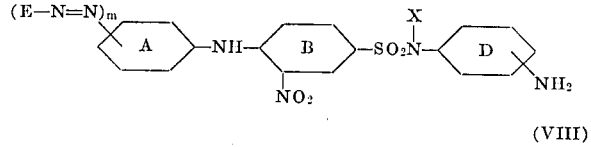

(VIII)

followed by coupling with a compound of the formula

(IX).

In the especially preferred dyes of formula (I) the sum of $m$ and $n$ is 1.

Mixtures of dyes of formula (I) also exhibit outstandingly good properties. These mixtures can be obtained for example, by reacting 1 mole of a compound of the formula

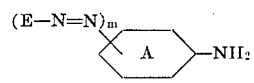

with 1 mole of a mixture of different compounds of formula

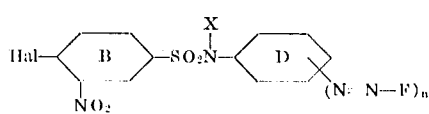

or by reacting 1 mole of a mixture of different compounds of the formula

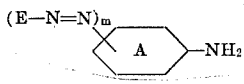

with 1 mole of a compound of the formula

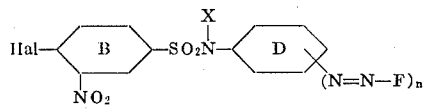

It is of great advantage to convert the new dyes into dye preparations before their application, using known methods for this purpose, e.g. grinding in the presence of dispersing agents and/or fillers, with subsequent vacuum or spray drying if dry preparations are desired. After the addition of a suitable volume of water the dyes can be applied to the substrate by exhaustion dyeing, pad dyeing or printing methods at long or short liquor ratio.

From aqueous dispersions the dyes build up excellently on textile materials consisting of synthetic or semi-synthetic organic substances, of hydrophobic character and high molecular weight. They are especially suitable for dyeing and printing textiles of linear aromatic polyester fibres, cellulose diacetate, cellulose triacetate and polyamide fibres. They are also dyeable on polyolefins.

The known exhaustion dyeing, pad dyeing and printing methods are employed, for example the process described in French Pat. No. 1,445,371.

The dyeings obtained are of yellow shade and are extremely fast, showing excellent fastness to heat treatments (thermofixation, sublimation, pleating), gas fumes, cross dyeing, dry cleaning, chlorine and wet tests such as washing, water and perspiration. They are highly stable to the conditions of the pre-cure and post-cure permanent press finishing process. The dischargeability and the reserve of wool and cotton are good. Their fastness to light is outstandingly good, even in pale shades, which makes the new dyes well suitable as components for the production of fashionable pastel combination shades. At temperatures in the range of 80°C to 140°C the dyes are resistant to reduction by boiling: this stability is not adversely affected by the liquor ratio or by the presence of dyeing accelerants.

In the following Examples the parts are by weight and the temperatures in degrees centigrade.

EXAMPLE 1

A mixture of 25.6 parts of 1-chloro-2-nitrobenzene-4-sulphonic acid chloride. 19.7 parts of 4-amino-1,1'-azobenzene, 250 parts of ethylene glycol and 20 parts of anhydrous sodium acetate is raised to 50° in 30 minutes and stirred at this temperature for 2 hours. 12.8 parts of 1-amino-4-chlorobenzene are added to the reaction mixture and the temperature is then increased over 1 hour to 150°. After stirring for 3 hours at 150°–155° the reaction mixture is allowed to cool to room temperature, on which the dye settles out in crystalline form. It is filtered off, washed with a little ethanol and then with hot water, and finally dried. On synthetic fibers the dye thus obtained gives dyeings of yellow shade which have excellent fastness properties

EXAMPLE 2

A mixture of 31.3 parts of 1-chloro-2-nitrobenzene-4-sulphonic acid phenylamide. 19.7 parts of 4-amino-1,1'-azobenzene, 20 parts of polyethylene glycol and 10 parts of anhydrous sodium acetate is raised to 160° in 30 minutes with vigorous stirring, stirred for a further 24 hours at 160°–165° and then allowed to cool to about 70°. At this temperature the reaction mixture is diluted with 100 parts of ethanol, after which 40 parts of water are added very slowly. The dye settles out and after 2 hours it is filtered off, washed with some ethanol and then with hot water, and dried. The pure dye, applied to synthetic fibres, gives reddish yellow dyeings having excellent fastness properties.

EXAMPLE 3

A mixture of 31.7 parts of the compound of the formula

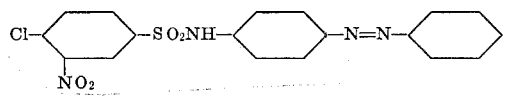

the production of which is described in Example 1, 9.3 parts of aniline. 200 parts of ethylene glycol and 10 parts of anhydrous sodium acetate is raised over 40 minutes to 145° and reacted for 2 hours at 145°–150° with stirring. After this time the mixture is allowed to cool to 20°–30°. The dye settling out in crystalline form and is filtered off, washed with some ethanol and then with hot water and subsequently dried. Yellow dyeings of excellent all-round fastness are obtained with thin dye on synthetic fibre materials.

EXAMPLE 4

A mixture of 25.6 parts of 1-chloro-2-nitrobenzene-4-sulphonic acid chloride. 29.4 parts of 4-amino-1,1' azobenzene, 250 parts of ethylene glycol and 20 parts of anhydrous sodium acetate is raised to 80° in 2 hours with thorough stirring. The temperature is held at 80° for 1 hour, then at 150° for 3 hours and subsequently at 170° for 2 hours. After this time the reaction mixture is allowed to cool to 70° and is diluted with 100 parts of ethanol. Cooling is allowed to continue and the precipitated dye is filtered off at room temperature. It is washed with ethanol and then with hot water and dried. The dye thus obtained dyes synthetic fibres in yellow shades with excellent fastness properties.

EXAMPLE 5

A mixture of 32.7 parts of 1-chloro-2-nitrobenzene-4-sulphonic acid-(3'-methyl)-phenylamide, 34.3 parts of 1-chloro-2-nitrobenzene-4-sulphonic acid-(2'-methoxy)-phenylamide. 39.4 parts of 4-amino-1,1'-azobenzene and 30 parts of anhydrous sodium acetate is brought to 170°–180° over 30 minutes, on which a melt is formed which is stirred for 8–12 hours at the same temperature. It is then allowed to cool to 150°, at which point 40 parts of ethylene glycol are added, and then to 90°, when 80 parts of ethanol are added, followed after a few minutes by 40 parts of water. The mixture is vigorously stirred for 1 hour at 80°, after which time the precipitated product is filtered off. The filtercake is washed with a little cold ethanol and then with ample hot water and finally dried. The dye mixture thus obtained gives dyeings of reddish yellow shade on polyester fibres which have excellent fastness properties.

EXAMPLE 6

A mixture of 31.3 parts of 1-chloro-2-nitrobenzene-4-sulphonic acid phenylamide, 34.3 parts of 1-chloro-2-nitrobenzene-4-sulphonic acid-(2'-methoxy)-phenylamide. 32.7 parts of 1-chloro-2-nitrobenzene-4-sulphonic acid-(3'-methyl)-phenylamide, 59.1 parts 4-amino-1,1'-azobenzene and 45 parts of anhydrous sodium acetate is raised to 160°–180° in 30 minutes to form a melt which is stirred for 8 to 12 hours at this temperature. It is then allowed to cool to 150°, on which 70 parts of ethylene glycol are added, and then further to 90°, at which point 150 parts of ethanol are added, followed after a few minutes by 70 parts of water. Vigorous stirring is maintained for 1 hour at 80° causing precipitation of the dye of mixed constitution formed by the reaction. The filtercake is washed with cold methanol and then with abundant hot water and finally dried. The dye mixture yielded by this procedure gives dyeings of reddish yellow shade on polyester fibres which have excellent all round fastness.

EXAMPLE 7

A mixture of 37.1 parts of the compound of formula

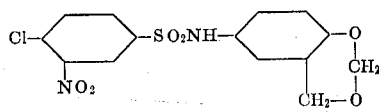

15 parts of anhydrous sodium acetate and 19.7 parts of 4-amino-1,1'-azobenzene is raised to 170° in 30 minutes and the resulting melt is stirred for 15 hours at 160°–175°. After partial cooling to 150° 20 parts of ethylene glycol are added, then cooling is continued to 90° for the addition of 50 parts ethanol and after a few minutes 30 parts of water. The mixture is stirred thoroughly for a further hour at 80° which caused the dye to settle out. It is filtered off, washed with a little cold ethanol and then with ample hot water and finally dried. The dye thus obtained dyes synthetic fibres in reddish yellow shades which have excellent fastness properties.

EXAMPLE 8

A mixture of 32.7 parts of 1-chloro-2-nitrobenzene-4-sulphonic acid-(3'-methyl)-phenylamide. 35.5 parts of 1-chloro-2-nitrobenzene-4-sulphonic acid-N-ethyl-N-(3'-methyl)-phenylamide, 39.4 parts of 4-amino-1,1'-azobenzene and 30 parts of anhydrous sodium acetate is heated up to 170°–180° over 30 minutes to form a melt which is stirred for 8–12 hours at the same temperature. It is allowed to cool to 150°, on which 40 parts of ethylene glycol are added, then cooling is continued to 90°, at which point 80 parts of ethanol and after a few minutes 40 parts of water are added. The mixture is vigorously stirred for 1 hour at 80° and the precipitated product is filtered off, washed with some cold ethanol and then with ample hot water and finally dried. This procedure results in a dye mixture which gives dyeings of reddish yellow shade on polyester fibres having excellent fastness properties.

EXAMPLE 9

A mixture of 39.9 parts of 1-bromo-2-nitrobenzene-4-sulphonic acid-N-ethyl-N-(3'-methyl)-phenylamide. 19.7 parts of 4-amino-1,1'-azobenzene and 15 parts of anhydrous sodium acetate is raised to 150° in 30 minutes and the resulting melt stirred for 10 hours at 145°–150°. It is allowed to cool to 120°, on which 20 parts of ethylene glycol are added, and then to 90° for the addition of 40 parts of ethanol followed in a few minutes by 15 parts of water. The mixture is vigorously stirred for 2 hours at 70°–80°. The precipitated product is then filtered off, washed with some cold ethanol and then with ample hot water and dried. The dye thus obtained dye synthetic fibres in reddish yellow shades with excellent fastness properties.

EXAMPLE 10

A mixture of 32.7 parts of 1-chloro 2-nitrobenzene-4-sulphonic acid-N-methylphenylamide. 19.7 parts of 4-amino-1,1'-azobenzene, 80 parts of polyethylene glycol and 15 parts of anhydrous sodium acetate is raised to 160° in 30 minutes with vigorous stirring and stirred for 24 hours at 160°–170°. It is then allowed to cool to about 70°. At this temperature the reaction mixture is diluted with 100 parts of ethanol and when 2 hours have elapsed the precipitated dye is filtered off. It is washed with a little ethanol and then with hot water and dried. The purified dye gives dyeings of reddish yellow shade on synthetic fibres showing excellent all-round fastness.

EXAMPLE 11

A mixture of 40 parts of 1-chloro-2,6-dinitrobenzene-4-sulphonic acid-N-ethyl-N-(3'-methyl)-phenylamide, 19.7 parts of 4-amino-1,1'-azobenzene. 15 parts of anhydrous sodium acetate and 200 parts of ethylene glycol is brought to 140°, stirred for 2–3 hours at 140°–150° and then allowed to cool to 20°–30°. The dye, which settles out in crystalline form, is filtered off, washed with some ethanol and then with hot water and dried. On synthetic fibres the dye obtained by this procedure gives dyeings of yellow shade having outstandingly good fastness properties.

DYEING EXAMPLE 1

A mixture of 7 parts of the dye obtained as specified in Example 1, 4 parts of sodium dinaphthylmethanedisulphonate, 4 parts of sodium cetylsulphate and 5 parts of sodium sulphate is ground in a ball mill for 48 hours to give a fine powder. Two parts of the powder are dispersed in 3000 parts of water set with 3 parts of a 30 percent solution of a highly sulphonated castor oil and 20 parts of an emulsion of a chlorinated benzene. Into this dyebath 100 parts of a fabric of polyester fibre are entered at 20°–25°, on which the bath temperature is increased to 95°–100° in about 30 minutes and the fabric dyed for 1 hour at this temperature. It is then removed, washed off, soaped for 15 minutes at 70° with a 0.1 percent solution of an alkylphenylpolyglycol ether, rinsed and dried. A yellow dyeing having excellent fastness properties is obtained.

DYEING EXAMPLE 2

A mixture of 30 parts of the dye obtained as given in Example 2, 40 parts of sodium dinaphthylmethanedisulphonate, 50 parts of sodium cetylsulphate and 50 parts of anhydrous sodium sulphate is ground in a ball mill for 48 hours to form a fine powder. 4 Parts of this dye powder are dispersed in 1000 parts of water at 40°-50° and 100 parts of a scoured fabric of polyester fibre are entered into the bath. The bath is raised slowly to 130° and the fabric dyed for about 1 hour at this temperature under pressure. Subsequently it is washed off, soaped, rinsed and dried. The yellow dyeing produced on the polyester fabric has excellent fastness properties.

DYEING EXAMPLE 3

A fine aqueous dispersion of 30 parts of the dye mixture obtained by the procedure of Example 6, 70 parts of sodiumdinaphthylmethanedisulphonate and 3 parts of sodium alginate is made up to 1000 parts with water and thoroughly mixed. This padding liquor is applied to a polyester fabric at 20° and after intermediate drying in air at 60°-100° the pad dyeing is fixed by exposure for 60 seconds in a dry air atmosphere at 230°. After fixation the fabric is rinsed, soaped, rinsed again and dried. The level yellow dyeing thus produced has good all-round fastness.

DYEING EXAMPLE 4

A mixture of 15 parts of the dye of Example 1, 20 parts of sodium dinaphthylmethanedisulphonate, 25 parts of sodium cetylsulphate and 25 parts of anhydrous sodium sulphate is ground in a ball mill for 48 hours to form a fine powder. 5 Parts of this dye preparation are dispersed in 4000 parts of water and into this bath 100 parts of a scoured fabric of cellulose triacetate fibre are entered. The bath temperature is raised slowly to 95°-100° and the fabric dyed for one hour at this temperature. On removal it is washed off, soaped for 15 minutes at 70° with a 0.1 percent solution of an alkylphenolpolyglycol ether, rinsed and dried. A red dyeing with good fastness properties is obtained.

DYEING EXAMPLE 5

A mixture of 7 parts of the dye of Example 7, 4 parts of sodium dinaphthylmethanedisulphonate, 4 parts of sodium cetylsulphate and 5 parts of anhydrous sodium sulphate is ground in a ball mill for 48 hours. A fine powder is formed, 2 parts of which are dispersed in 3000 parts of water containing 3 parts of a 30 percent solution of a highly sulphonated castor oil. At 20°-25° 100 parts of a cellulose diacetate fabric are entered, the bath is raised to 80°-82° in about 30 minutes and the fabric dyed for 1 hour at this temperature. It is then removed, washed off, soaped, rinsed and dried. A reddish yellow dyeing having good fastness properties is obtained.

DYEING EXAMPLE 6

In a ball mill, a mixture of 7 parts of the dye of Example 7, 13 parts of powder from spent sulphite cellulose liquor and 100 parts of water is ground to a paste which is dried in an injection dryer. 4 Parts of the paste are dispersed in a little water and the dispersion is run through a sieve into a bath of 4000 parts of water set with 4 parts of N-oleyl-N'-hydroxyethyl-N'-(3'-sulpho-2'-hydroxypropyl)-ethylenediamine. 100 Parts of a fabric of nylon polyamide fibre are entered into the bath at 20° the bath is raised to 100° in 30 minutes and the fabric dyed for 1 hour at this temperature, with subsequent rinsing and drying. The reddish yellow dyeing thus produced is level and has good fastness properties.

The dyes listed in the following table conform to the general formula

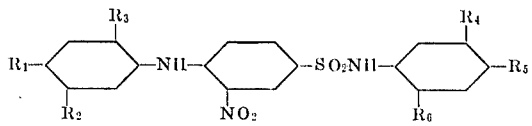

TABLE I

| Example | R₁ | R₂ | R₃ | R₄ | R₅ | R₆ | Shade on polyester fibre |
|---|---|---|---|---|---|---|---|
| 11a | H₃C₅—N=N— | H | H | H | —Cl | H | Reddish yellow. |
| 11b | H₃C₅—N=N— | H | H | H | H | —OH | Do. |
| 11c | H₃C₅—N=N— | H | H | H | H | H | Do. |
| 11d | H | H | H | H | —N=N—C₆H₄—NO₂ | H | Yellow. |
| 11e | Cl—C₆H₄—N=N— | H | H | H | —N=N—C₆H₄—OH | H | Reddish yellow. |
| 11f | Same as above | H | H | H | —Cl | H | Do. |
| 11g | O₂N—C₆H₄—N=N— | —CH₃ | —OCH₃ | H | —N=N—C₆H₄—Cl | H | Do. |
| 12 | N≡C—C₆H₄—N=N— | —OCH₃ | H | H | H | H | Do. |
| 13 | H | —Cl | H | —N=N—C₆H₄—OH | H | H | Yellow. |
| 14 | H | H | H | H | —N=N—C₆H₅ | H | Reddish yellow. |
| 15 | CH₃O₂S—(decalinyl)—N=N— | H | H | H | H | H | Do. |
| 16 | (benzothiazol-2-yl)—N=N— | H | H | H | H | H | Do. |
| 17 | CH₃—(1-phenylpyrazol-yl)—N=N— | H | H | H | H | H | Do. |
| 18 | H₅C₆—N=N— | H | H | H | —N=N—C₆H₃(OH)(CH₃) | H | Do. |
| 19 | H₂NOC—(1H-pyrazol-yl)—N=N— | H | H | —CH₃ | H | H | Do. |

Table 1—Continued

| Example | $R_1$ | $R_2$ | $R_3$ | $R_4$ | $R_5$ | $R_6$ | Shade on polyester fibre |
|---|---|---|---|---|---|---|---|
| 20 | $O_2N$—⌬—N=N— | H | H | H | —N=N—⌬(OH)(CH$_3$) | H | Do. |
| 21 | H$_5$C$_6$—N=N— | —NHCO—CH$_3$ | H | H | H | H | Do. |
| 22 | Same as above | H | H | H | —N=N—⌬—NO$_2$ (thiazole) | H | Do. |
| 23 | (Cl-thiazole)—N=N— | H | H | H | H | H | Do. |
| 24 | H | H | H | H | —N=N—⌬—OCH$_3$ | H | Yellow. |
| 25 | N≡C—S—⌬—N=N— | H | H | H | H | H | Reddish yellow. |
| 26 | Br—⌬—N=N— | H | H | H | H | H | Do. |
| 27 | CH$_3$HN—SO$_2$—⌬—N=N— | H | H | H | H | H | Do. |
| 28 | CH$_3$CO—⌬—N=N— | H | H | H | H | H | Do. |
| 29 | H | H | H | H | —N=N—⌬—CH$_3$ | H | Yellow. |
| 30 | H$_5$C$_6$—N=N—(thiazole)—N=N— | H | H | —CH$_3$ | H | H | Reddish yellow. |
| 31 | H | H | H | H | —N=N—⌬(COCH$_3$)—OH | H | Yellow. |
| 32 | H | H | H | H | —N=N—CH(CONH—C$_6$H$_5$)— / quinoline-OH | H | Do. |
| 33 | H$_5$C$_6$—N=N— | H | H | H | —OCH$_3$ | H, OCH$_3$ | Reddish yellow. |
| 34 | Same as above | H | H | H | H | H, OCH$_3$ | Do. |
| 35 | do | H | H | —OCH$_3$ | H | —OCH$_3$ | Do. |
| 36 | do | H | H | —OCH$_3$ | —OCH$_3$ | —OCH$_3$ | Do. |
| 37 | do | H | H | H | H | H | Do. |
| 38 | do | H | H | —CH$_3$ | —CH$_3$ | H | Do. |
| 39 | do | H | H | H | H | —CH$_3$ | Do. |
| 40 | do | H | H | H | H | | |

Table I—Continued

| Example | R₁ | R₂ | R₃ | R₄ | R₅ | R₆ | Shade on polyester fibre |
|---|---|---|---|---|---|---|---|
| 41 | do | H | H | —Cl | H | H | Do. |
| 42 | do | H | H | H | —OCH₂CH₂OH | —Cl | Do. |
| 43 | do | H | H | H | —OCH₂CH₂OCOCH₃ | H | Do. |
| 44 | do | H | H | H | —CH₃ | H | Do. |
| 45 | do | H | H | —CH₃ | H | —CH₃ | Do. |
| 46 | ![pyrazole]—N=N— | H | H | H | H | H | Do. |
| 47 | ![quinoline]—N=N— | H | H | —CH₃ | H | H | Do. |
| 48 | H₅C₆—N=N— | H—CH₃ | H | —CH₃ | H | —CH₃ | Do. |
| 49 | Same as above | H | H | —CH₃ | Cl | H | Do. |
| 50 | do | H | H | Cl | H | —CH₃ | Do. |
| 51 | do | H | H | —CH₃ | —OCH₂CH₃ | —CH₃ | Do. |
| 52 | do | H | H | —CH₃ | —CH₃ | H | Do. |
| 53 | do | H | H | —CH₃ | H | H | Do. |
| 54 | do | H | —OCH₃ | H | H | H | Do. |
| 55 | do | H | H | H | —N=N—⌬—NO₂ | H | Do. |
| 56 | F₃C—⌬—N=N— | H | —C₂H₅ | H | H | —C₂H₅ | Do. |
| 57 | CH₃—⌬—N=N— | —NHCHO | H | —CH₃ | —O—C₆H₅ | H | Do. |
| 58 | H₅C₆—N=N—⌭(tetrazole) | H | H | H | —NHCOCH₂CH₃ | H | Do. |
| 59 | ⌭—N=N— | H | H | H | H | H | Do. |
| 60 | H | H | H | H | N=N—⌭(triazole) | H | Do. |
| 61 | H | H | H | H | N=N—⌬⌬(quinoline) | H | Do. |
| 62 | H | H | H | H | N=N—⌭(thiazole) | H | Do. |

The dyes set forth in the following Table II conform to the formula

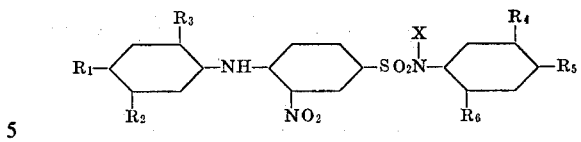

TABLE II

| Example | X | R₁ | R₂ | R₃ | R₄ | R₅ | R₆ | Shade on Polyester fibre |
|---|---|---|---|---|---|---|---|---|
| 63 | –CH₃ | H₅C₆–N=N– | H | H | –CH₃ | H | H | reddish yellow |
| 64 | do. | do. | H | H | H | –CH₃ | H | do. |
| 65 | do. | do. | H | H | H | H | –CH₃ | do. |
| 66 | do. | do. | H | H | H | –CH₃ | do. | do. |
| 67 | do. | do. | H | H | –CH₃ | H | do. | do. |
| 68 | do. | do. | H | H | H | –Cl | do. | do. |
| 69 | do. | do. | H | H | –Cl | H | do. | do. |
| 70 | do. | do. | H | H | –OCH₃ | H | H | do. |
| 71 | do. | do. | H | H | H | –OCH₃ | H | do. |
| 72 | do. | do. | H | H | H | H | –OCH₃ | do. |
| 73 | do. | do. | H | H | –OCH₃ | H | do. | do. |
| 74 | do. | do. | H | H | H | –OCH₃ | do. | do. |
| 75 | do. | do. | H | H | –Cl | H | H | do. |
| 76 | do. | do. | H | H | H | –Cl | H | do. |
| 77 | do. | do. | H | H | H | H | –Cl | do. |
| 78 | do. | do. | H | H | –Br | H | H | do. |
| 79 | do. | do. | H | H | H | –Br | H | do. |
| 80 | do. | do. | H | H | H | H | –Br | do. |
| 81 | –CH₂CH₃ | do. | H | H | H | H | H | do. |
| 82 | do. | do. | H | H | –CH₃ | H | H | do. |
| 83 | –CH₂CH₂CH | do. | H | H | do. | H | H | do. |

TABLE II

| Ex. | X | $R_1$ | $R_2$ | $R_3$ | $R_4$ | $R_5$ | $R_6$ | Shade on polyester fibre |
|---|---|---|---|---|---|---|---|---|
| 84 | —CH₂CH₂CH₃ | H₅C₆—N=N— | H | H | —CH₃ | H | H | Reddish yellow. |
| 85 | —CH₂CH₃ | CH₃CH₂OCONH—〈 〉—N=N— | H | H | Same as above | H | H | Do. |
| 86 | Same as above | H | H | H | H | H | H | Yellow. |
| 87 | —CH₃ | H₅C₆—N=N— | —CH₃ | H | CH₃ | H | H | Reddish yellow. |
| 88 | Same as above | do. | H | —OCH₃ | H | H | H | Do. |
| 89 | do. | do. | —Cl | —OCH₃ | H | H | H | Do. |
| 90 | do. | do. | —OCH₃ | H | H | H | H | Do. |
| 91 | do. | do. | —NHCOCH₃ | H | H | H | H | Do. |
| 92 | do. | O₂N—〈 〉—N=N— | H | H | —CH₃ | H | H | Do. |
| 93 | do. | Cl—〈 〉—N=N— | H | H | H | H | H | Do. |
| 94 | do. | CH₃O₂S—〈 〉—N=N— | H | H | —CH₃ | H | H | Do. |
| 95 | do. | [benzothiazolyl]—N=N— | H | H | Same as above | H | H | Do. |
| 96 | do. | [thiazolyl-CH₃,C₆H₅]—N=N— | H | H | do. | H | H | Do. |
| 97 | do. | [Cl-thiazolyl-S]—N=N— | H | H | do. | H | H | Do. |
| 98 | do. | 〈 〉—CH₃—N=N— | —CH₃ | H | do. | H | H | Do. |
| 99 | do. | CH₃O—〈 〉—N=N— | H | H | do. | H | H | Do. |
| 100 | do. | C₆H₅—N=N— | H | —CH₃ | do. | H | H | Do. |
| 101 | do. | Same as above | H | H | H | H | H | Do. |

TABLE II—Continued

| Ex. | X | $R_1$ | $R_2$ | $R_3$ | $R_4$ | $R_5$ | $R_6$ | Shade on polyester fibre |
|---|---|---|---|---|---|---|---|---|
| 102 | —CH₂CH₂— |  | H | H | H | H | H | Do. |
| 103 | —CH₂CH₂— |  | H | H | H | H | H | Do. |
| 104 | —CH₂CH₂— |  | H | H | H | H | H | Do. |
| 105 | —CH₂CH₂COOCH₃ | do | H | H | H | H | H | Do. |
| 106 | —CH₂CH₂OCOCH₃ | do | H | H | H | H | H | Do. |
| 107 | —CH₂CH₂OCOOCH₃ | do | H | H | H | H | H | Do. |
| 108 | —CH₂CH₂Cl | do | H | H | H | H | H | Do. |
| 109 | —CH₂CH₂OCO—C₆H₅ | do | H | H | H | H | H | Do. |
| 110 | —CH₃ | —Cl | H | H | H | H | H | Yellow. |
| 111 | —CH₂CH₂OCOCH₃ | H | H | H | H | —N=N—C₆H₅ | H | Do. |
| 112 | —CH₃ | H₅C₆—N=N— | H | H | —CH₃ | 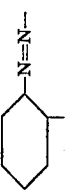 | H | Reddish yellow. |
| 113 | —CH₂CH₂CH₃ | Same as above | H | H | Same as above | H | H | Do. |
| 114 | —CH₂CH₂CH₃ | do | H | H | H | H | H | Do. |
| 115 | —CH₃ | do | H | H | H | —NO₂ | H | Do. |
| 116 | Same as above | do | H | H | H | —CN | H | Do. |
| 117 | do | do | H | H | H | 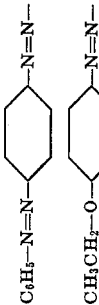 | H | Do. |
| 118 | do | H | Br | H | H | —S—C≡N | H | Yellow. |
| 119 | —CH₂CH₂Cl | 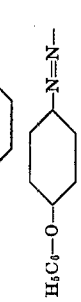 | H | H | H | —S—C≡N | H | Reddish yellow. |
| 120 | —CH₂CH₂COOCH₂CH₃ | C₆H₅—N=N—⟨⟩— | —CH₃ | H | H | —O—CH₂CH₂OCOCH₂CH₃ | H | Do. |
| 121 | —CH₂—C₆H₅ | CH₃CH₂—O—⟨⟩—N=N—⟨⟩— | Same as above | H | —CH₃ | H | H | Do. |
| 122 | —CH₂—CH—CH₃<br>   Cl | H₅C₆—O—⟨⟩—N=N—⟨⟩— | do | H | H | —SO₂CH₃ | H | Do. |
| 123 | CH₂CH₂OH | CH₃CH₂O₂S—⟨⟩—N=N—⟨⟩— | do | H | H | —SO₂CH₂CH₃ | H | Do. |
| 124 | CH<br>—CH₂—CH—CH₃ | HOCH₂CH₂O₂S—⟨⟩—N=N—⟨⟩— | do | H | CH₃ | H | H | Do. |

TABLE II—Continued

| Ex. | X | R₁ | R₂ | R₃ | R₄ | R₅ | R₆ | Shade on polyester fibre |
|---|---|---|---|---|---|---|---|---|
| 125 | $-CH_2-\overset{CN}{\underset{\|}{CH}}-CH_3$ | $H_2NO_2S-\!\!\bigcirc\!\!-N=N-$ | $CH_3$ | H | Same as above | H | H | Do. |
| 126 | $-CH_2CH_2OCOCH_2CH_3$ | $(CH_3)_2NO_2S-\!\!\bigcirc\!\!-N=N-$ | H | H | do | $SO_2NH_2$ | H | Do. |
| 127 | $-CH_2CH_2OCOOCH_2CH_3$ | $CH_3CH_2NHO_2S-\!\!\overset{Cl}{\bigcirc}\!\!-N=N-$ | H | H | do | H | H | Do. |
| 128 | $-CH_2CH_2CONH_2$ | $(CH_3CH_2)_2NO_2S-\!\!\bigcirc\!\!-N=N-$ | H | H | do | H | H | Do. |
| 129 | $CH_2CH_2OCOOCH_2C_6H_5$ | $N\!\equiv\!C-CH_2CH_2NHO_2S-\!\!\bigcirc\!\!-N=N-$ | H | H | do | H | H | Do. |
| 130 | $-CH_2CH_2OCH_3$ | $(N\!\equiv\!C-CH_2CH_2)_2NO_2S-\!\!\bigcirc\!\!-N=N-$ | H | H | do | $-CH_3$ | H | Do. |
| 131 | $-CH_2CH_2OCH_2CH_3$ | $HOCH_2CH_2NHO_2S-\!\!\bigcirc\!\!-N=N-$ | H | H | do | H | H | Do. |
| 132 | $-CH_2CH_2-O-C_6H_5$ | $(HOCH_2CH_2)_2NO_2S-\!\!\bigcirc\!\!-N=N-$ | H | H | do | H | H | Do. |
| 133 | $-CH_2-\overset{CH_3}{\underset{\|}{CH}}-O-CH_3$ | $H_5C_6-NHO_2S-\!\!\bigcirc\!\!-N=N-$ | H | H | do | H | $-CH_3$ | Do. |
| 134 | $-CH_2-\overset{CH_3}{\underset{\|}{CH}}-O-CH_2CH_3$ | $HOC-\!\!\bigcirc\!\!-N=N-$ | H | H | do | H | H | Do. |
| 135 | $-CH_2CH_3$ | $OHCHN-\!\!\bigcirc\!\!-N=N-$ | H | H | do | H | H | Do. |
| 136 | $-CH_2CH_3$ | $CH_3CONH-\!\!\bigcirc\!\!-N=N-$ | H | H | do | H | H | Do. |
| 137 | $-CH_2-CH_2-CH_3$ | $CH_3CH_2CONH-\!\!\bigcirc\!\!-N=N-$ | H | H | do | H | H | Do. |
| 138 | $-CH_2CH_2OCOCH_3$ | $H_5C_6-CONH-\!\!\bigcirc\!\!-N=N-$ | H | H | H | $-SO_2CH_2-C_6H_5$ | H | Do. |
| 139 | $-CH_2CH_3$ | $CH_3O-\overset{O}{\underset{\|}{C}}-\!\!\bigcirc\!\!-N=N-$ | $-NHCOC_2H_5$ | H | $CH_3$ | H | H | Orange. |
| 140 | $-CH_3$ | $CH_3CH_2-O-\overset{O}{\underset{\|}{C}}-\!\!\bigcirc\!\!-N=N-$ | H | H | Same as above | H | H | Reddish yellow. |

TABLE II—Continued

| Ex. | X | R₁ | R₂ | R₃ | R₄ | R₅ | R₆ | Shade on polyester fibre |
|---|---|---|---|---|---|---|---|---|
| 141 | —CH₂CH₃ | ClCH₂CH₂CONH—⟨C₆H₄⟩—N=N— | H | H | ...do... | H | H | Do. |
| 142 | —CH₂CH₂OCON(CH₃)₂ | Br—⟨thiazole⟩—N=N— | H | H | ...do... | H | H | Do. |
| 143 | —CH₂CONH₂ | CH₃O—⟨thiazole⟩—N=N— | H | H | ...do... | H | H | Do. |
| 144 | —CH₂CH₃ | H₃C—⟨thiazole⟩—N=N— | H | H | ...do... | H | II | Do. |
| 145 | —CH₂CH₃ | N≡C—⟨thiazole⟩—N=N— | H | H | H | H | —OCH₃ | Do. |
| 146 | —CH₂CH₂OCONH—C₆H₅ | O₂N—⟨thiazole⟩—N=N— | H | H | CH₃ | H | H | Do. |
| 147 | —CH₂CH₃ | F₃C—⟨thiazole⟩—N=N— | H | H | Same as above | H | H | Do. |
| 148 | —CH₂CH₃ | CH₃O₂S—⟨thiazole⟩—N=N— | H | H | ...do... | H | H | Do. |
| 149 | —CH₂CH₂OCOCH₃ | Cl—⟨benzothiazole⟩—N=N— | H | H | H | —Cl | H | Do. |
| 150 | —CH₂CH₂CONH₂ | Br—⟨benzothiazole⟩—N=N— | H | H | H | H | —OCH₃ | Do. |
| 151 | —CH₂CH₃ | O₂N—⟨benzothiazole⟩—N=N— | H | H | H | —SO₂NHCH₃ | H | Do. |

TABLE II – Continued

| Ex. | X | R$_1$ | R$_2$ | R$_3$ | R$_4$ | R$_5$ | R$_6$ | Shade on polyester fibre |
|---|---|---|---|---|---|---|---|---|
| 152 | Same as above | N≡C—〈benzothiazole〉—N=N— | H | H | H | —CH$_3$ | —CH$_3$ | Do. |
| 153 | do | CH$_3$O—〈benzothiazole〉—N=N— | H | H | H | —SO$_2$NHCH$_3$ | H | Do. |
| 154 | do | CF$_3$—〈benzothiazole〉—N=N— | H | H | H | —SO$_2$NHCH$_2$CH$_2$CH$_2$OCH$_3$ | H | Do. |
| 155 | do | CH$_3$O$_2$S—〈benzothiazole〉—N=N— | H | H | H | —SO$_2$N(CH$_3$)$_2$ | H | Do. |
| 156 | do | H$_2$NO$_2$S—〈benzothiazole〉—N=N— | H | H | H | —SO$_2$N(CH$_2$CH$_3$)$_2$ | H | Do. |
| 157 | do | CH$_3$HNO$_2$S—〈benzothiazole〉—N=N— | H | H | CH$_3$ | H | H | Do. |
| 158 | do | (CH$_3$)$_2$NO$_2$S—〈benzothiazole〉—N=N— | H | H | Same as above | H | H | Do. |
| 159 | do | CH$_3$CH$_2$HNO$_2$S—〈benzothiazole〉—N=N— | H | H | do | H | H | Do. |
| 160 | do | (CH$_3$CH$_2$)$_2$NO$_2$S—〈benzothiazole〉—N=N— | H | H | do | H | H | Do. |
| 161 | do | (HOCH$_2$CH$_2$)$_2$NO$_2$S—〈benzothiazole〉—N=N— | H | H | do | H | H | Do. |

TABLE II—Continued

| Ex. | X | $R_1$ | $R_2$ | $R_3$ | $R_4$ | $R_5$ | $R_6$ | Shade on polyester fibre |
|---|---|---|---|---|---|---|---|---|
| 162 | H | —Cl | H | H | ---do--- | —N=N—⟨C₆H₄-Br⟩ | H | Do. |
| 163 | —CH₃ | ⟨thiazole⟩—N=N— | H | H | ---do--- | H | H | Do. |
| 164 | —CH₂CH₃ | —Br | H | H | —NHCHO | —N=N—⟨C₆H₄-CN⟩ | H | |
| 165 | Same as above | H | H | H | —NHCO—C₆H₅ | —N=N—⟨C₆H₄-CH₂CH₃⟩ | H | Do. |
| 166 | ---do--- | —NHCO—C₆H₅ | H | H | —CH₃ | —N=N—⟨C₆H₄-OCH₂CH₃⟩ | H | Do. |
| 167 | ---do--- | —NHCOOCH₃ | H | H | Same as above | —N=N—⟨C₆H₄-SC≡N⟩ | H | Do. |
| 168 | —CH₂CH₂OCH₃ | H | —CH₃ | H | ---do--- | —N=N—⟨C₆H₄-O-C₆H₅⟩ | H | Do. |
| 169 | —CH₂CH₂OCOCH₃ | H | Same as above | H | ---do--- | —N=N—⟨C₆H₄⟩ | H | Do. |
| 170 | —CH₂CH₂OCOCH₃ | H | —Cl | H | ---do--- | —N=N—⟨C₆H₄-CF₃⟩ | H | Yellow. |
| 171 | —CH₂CH₃ | —NHCOOCH₂CH₃ | H | H | ---do--- | —N=N—⟨C₆H₄-COCH₃⟩ | H | Do. |
| 172 | Same as above | —NHCOOCH₂—C₆H₅ | H | H | ---do--- | —N=N—⟨C₆H₄-CO-C₆H₅⟩ | H | Do. |
| 173 | ---do--- | —NHCOCH₂CH₂Cl | H | H | ---do--- | —N=N—⟨C₆H₄-SO₂CH₃⟩ | H | Do. |
| 174 | ---do--- | H | Br | H | ---do--- | —N=N—⟨C₆H₄-SO₂CH₂CH₃⟩ | H | Do. |
| 175 | ---do--- | Br | H | H | ---do--- | —N=N—⟨C₆H₄-SO₂N(CH₃)₂⟩ | H | Do. |
| 176 | ---do--- | Cl | H | H | ---do--- | —N=N—⟨C₆H₄-SO₂CH₂CH₂OH⟩ | H | Do. |
|  |  |  |  |  |  | —N=N—⟨C₆H₄-SO₂NH₂⟩ | H | Do. |

TABLE II—Continued

| Ex. | X | R₁ | R₂ | R₃ | R₄ | R₅ | R₆ | Shade on polyester fibre |
|---|---|---|---|---|---|---|---|---|
| 177 | ...do... | H | Cl | H | H | —N=N—C₆H₄—SO₂NHCH₃ | H | Do. |
| 178 | ...do... | H | H | H | H | —N=N—C₆H₄—SO₂NHC₂H₅ | H | Do. |
| 179 | ...do... | H | H | H | H | —N=N—C₆H₄—SO₂N(C₂H₅)₂ | H | Do. |
| 180 | ...do... | H | CH₃ | H | —CH₃ | —N=N—C₆H₃(Cl)—NO₂ | H | Do. |
| 181 | ...do... | H | H | H | H | —N=N—C₆H₄—SO₂NHCH₂CH₂CN | H | Do. |
| 182 | ...do... | H | —CH₃ | H | —CH₃ | —N=N—C₆H₄—SO₂N(CH₂CH₂CN)₂ | H | Do. |
| 183 | ...do... | H | H | H | Same as above | —N=N—C₆H₃(Cl)—SO₂NHCH₂CH₂OH | H | Reddish yellow. |
| 184 | H | H | H | H | ...do... | —N=N—C₆H₄—SO₂N(CH₂CH₂OH)₂ | H | Yellow. |
| 185 | H | H | H | H | ...do... | —N=N—C₆H₄—SO₂NH—C₆H₅ | H | Do. |
| 186 | —CH₃ | H | H | H | ...do... | —N=N—C₆H₄—CHO | H | Do. |
| 187 | —CH₂CH₃ | H | H | H | H | —N=N—C₆H₄—NHCHO | —OCH₃ | Do. |
| 188 | —CH₂CH₂OCOCH₃ | H | H | H | —CH₃ | —N=N—C₆H₄—NHCOCH₃ | H | Do. |
| 189 | —CH₂CH₂OCOCH₂CH₃ | H | H | H | Same as above | —N=N—C₆H₄—NHCOCH₂CH₃ | H | Do. |
| 190 | —CH₂CH₂OCO—C₆H₅ | H | H | H | ...do... | —N=N—C₆H₄—NHCO—C₆H₅ | H | Do. |
| 191 | —CH₂CH₃ | H | H | H | ...do... | —N=N—C₆H₄—NHCOCH₂Cl | H | Do. |
| 192 | Same as above | H | H | H | H | —N=N—C₆H₄—COOCH₃ | H | Do. |

TABLE II.—Continued

| Ex. | X | R₁ | R₂ | R₃ | R₄ | R₅ | R₆ | Shade on polyester fibre |
|---|---|---|---|---|---|---|---|---|
| 193 | H | H | H | H | —CH₃ | —N=N—C₆H₄—COOCH₂CH₃ | H | Do. |
| 194 | —CH₂CH₃ | H | H | H | Same as above | —N=N—C₆H₄—COOCH₂C₆H₅ | H | Do. |
| 195 | Same as above | H | —CH₃ | H | do | —N=N—C₆H₄—NHCOOCH₃ | H | Do. |
| 196 | do | H | H | H | do | —N=N—C₆H₄—NHCOOCH₂CH₃ | H | Do. |
| 197 | do | CH₃OCONH—C₆H₄—N=N— | H | H | do | H | H | Reddish yellow. |
| 198 | H | H₅C₆—CH₂O—C(O)O—C₆H₄—N=N— | H | H | do | H | H | Do. |
| 199 | H | Cl | H | H | H | —N=N—C₆H₄—N(CH₃)₂ | H | Do. |
| 200 | H | H | Cl | H | H | —N=N—C₆H₄—N(CH₂CH₃)₂ | H | Do. |
| 201 | H | Br | H | H | H | —N=N—C₆H₄—N(CH₂CH₃)(CH₂CH₂CN) | H | Do. |
| 202 | H | H | H | H | H | —N=N—C₆H₄—N(CH₂CH₂OH)₂ | H | Do. |
| 203 | H | Cl | —CH₃ | H | H | —N=N—C₆H₄—N(CH₂CH₂CN)₂ | H | Yellow. |
| 204 | H | Cl | H | H | H | —N=N—C₆H₄—(pyrazole: CH₃, OH, N—C₆H₅) | H | Do. |
| 205 | H | Cl | H | H | H | —NH=N—(pyrazole: C₃H, OH, N—C₆H₅) | H | Do. |
| 206 | —CH₂CH₃ | H | H | H | —CH₃ | —N=N—C₆H₄—CONH₂ | H | Do. |
| 207 | Same as above | CH₃NH—C(O)—C₆H₄—N=N— | H | H | Same as above | H | H | Reddish yellow. |

TABLE II—Continued

| Ex. | X | R₁ | R₂ | R₃ | R₄ | R₅ | R₆ | Shade on polyester fibre |
|---|---|---|---|---|---|---|---|---|
| 208 | do | (CH₃)₂N-CO-C₆H₄-N=N-H | H | H | do | H | H | Do. |
| 209 | do | CH₃CH₂HN-CO-C₆H₄-N=N- | -CH₃ | H | do | H | H | Do. |
| 210 | do | (CH₃CH₂)₂N-CO-C₆H₄-N=N- | H | H | do | H | H | Do. |
| 211 | do | H₅C₆-NH-CO-C₆H₄-N=N- | -CH₃ | H | do | H | H | Do. |
| 212 | -CH₃ | H | H | H | do | -N=N-C₆H₄-CONHCH₃ | H | Yellow. |
| 213 | H | H | H | H | do | -N=N-C₆H₄-CONHCH₂CH₃ | H | Do. |
| 214 | H | H | H | H | do | -N=N-C₆H₄-CON(CH₃)₂ | H | Do. |
| 215 | H | H | H | H | do | -N=N-C₆H₄-CON(CH₂CH₃)₂ | H | Do. |
| 216 | H | H | -Cl | H | do | -N=N-C₆H₄-CONH-C₆H₅ | H | Do. |
| 217 | H | Cl | H | H | H | -N=N-(pyrazole with H₂N, N-C₆H₅) | H | Do. |
| 218 | H | H | H | H | H | -N=N-(pyrazole with CH₃, C₆H₅) | H | Do. |
| 219 | H | H | Cl | H | H | -N=N-(pyrazole with N-CH₂CH₃, NH₂) | H | Do. |
| 220 | H | H | H | H | H | -N=N-(pyrazole with CH₃, N-CH-CH₃) | H | Do. |
| 221 | H | H | Cl | H | H | -N=N-(pyrazole with NH₂, N-CH₂-C₆H₅) | H | Do. |
| 222 | -CH₂CH₃ | H₅C₆-N=N- | H | H | H | -SO₂-C₆H₅ | H | Reddish yellow. |

| Example | X | $R_1$ | $R_2$ | $R_3$ | $R_4$ | $R_5$ | $R_6$ | Shade on Polyester fibre |
|---|---|---|---|---|---|---|---|---|
| 223 | $CH_2CH_3$ | $H_5C_6-N=N-$ | H | H | H | $-SO_2N(CH_3)_2$ | H | reddish yellow |
| 224 | do. | do. | $-CH_3$ | H | H | $-SO_2N(CH_2CH_3)_2$ | H | do. |
| 225 | do. | do. | do. | H | H | $-COCH_3$ | H | do. |
| 226 | $-CH_3$ | do. | do. | H | H | $-CO-C_6H_5$ | H | do. |
| 227 | do. | do. | do. | H | H | $-CONH_2$ | H | do. |
| 227a | do. | do. | do. | H | H | $-CONHCH_3$ | H | do. |
| 228 | $-CH_2CH_3$ | do. | H | H | H | $-CON(CH_3)_2$ | H | do. |
| 229 | do. | do. | H | H | H | $-CONHCH_2CH_3$ | H | do. |
| 230 | do. | do. | H | H | H | $-CON(CH_2CH_3)_2$ | H | do. |
| 231 | $-CH_2CH_2CH_3$ | do. | H | H | H | $-CONHCH_2CH_2CH_2OCH_3$ | H | do. |

The dyes defined in the following Table III conform to the general formula

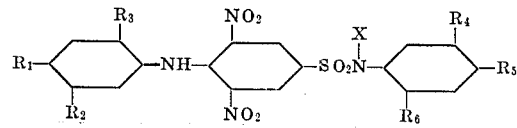

TABLE III

| Example | X | R₁ | R₂ | R₃ | R₄ | R₅ | R₆ | Shade on polyester fibre |
|---|---|---|---|---|---|---|---|---|
| 232 | —CH₂CH₃ | H₅C₆—N=N— | H | H | H | H | H | Reddish yellow. |
| 233 | Same as above | Same as above | —CH₃ | H | CH₃ | H | H | Do. |
| 234 | do | do | H | H | H | H | —OCH₃ | Do. |
| 235 | H | do | H | H | H | —OCH₃ | H | Do. |
| 236 | H | Cl | H | H | H | H | H | Yellow. |
| 237 | —CH₂CH₃ | Br | H | H | —CH₃ | —N=N—C₆H₅ | H | Do. |
| 238 | Same as above | H | Br | H | Same as above | Same as above | H | Do. |
| 239 | do | H | Cl | H | H | —N=N—⬡—Cl | H | Do. |
| 240 | do | H₅C₆—N=N— | H | —OCH₃ | —CH₃ | H | H | Reddish yellow. |
| 241 | —CH₂CH₂OCOCH₃ | do | H | H | —OCH₃ | H | H | Do. |
| 242 | H | do | H | H | H | H | —OCH₃ | Do. |
| 243 | H | do | H | H | —CH₃ | H | H | Do. |
| 244 | —CH₂CH₃ | O₂N—⬡—N=N— | H | H | —CH₃ | H | H | Do. |
| 245 | Same as above | Same as above | H | H | Same as above | H | H | Do. |
| 246 | —CH₂CH₂CN | Cl—⬡—N=N— | —CH₃ | H | —CH₃ | H | H | Do. |
| 247 | —CH₂CH₃ | H₅C₆—CH₂O₂S—⬡—N=N— | H | H | H | H | H | Do. |
| 248 | Same as above | H | H | H | H | —N=N—⬡(Cl)—SO₂CH₂—C₆H₅ | H | Do. |
| 249 | do | CH₃SO₂HN— | H | H | CH₃ | H | H | Do. |
| 250 | do | H | H | H | H | —N=N—⬡—NHSO₂CH₃ | H | Yellow. |
| 251 | do | H₂NOC—⬡—N=N— | H | H | —CH₃ | H | H | Reddish yellow. |

Formulae of especially preferred dyes of the foregoing Examples are as follows:

Example 2

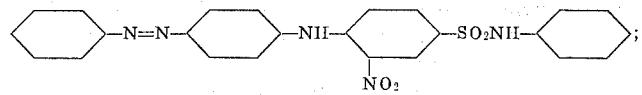

Example 3

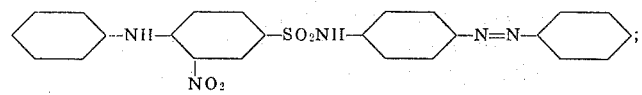

Example 9

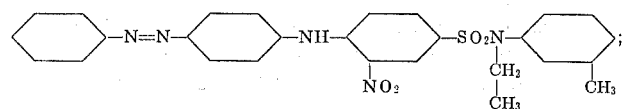

Example 10

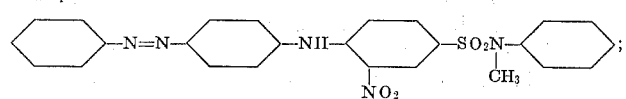

Example 34

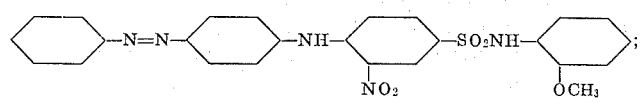

Example 37

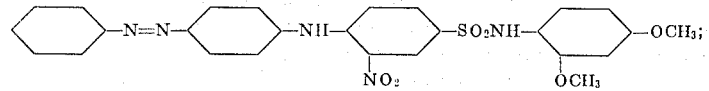

Example 38

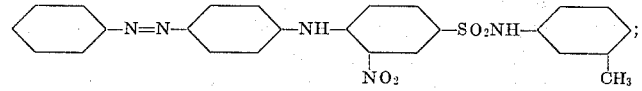

Example 81

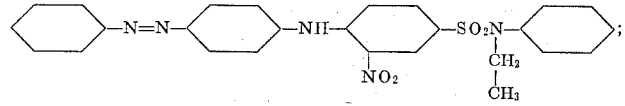

Having thus disclosed the invention what we claim is:
1. A compound of the formula

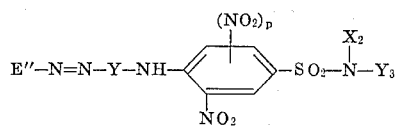

or

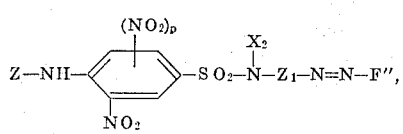

wherein
E'' is phenyl, substituted phenyl having 1 or 2 substituents, naphthyl or methylsulfonylnaphthyl,
wherein each substituent of substituted phenyl is independently chloro, bromo, lower alkyl, lower alkoxy, trifluoromethyl, nitro, cyano, thiocyano, phenoxy, formyl, acetyl, benzoyl, lower alkylsulfonyl, lower hydroxyalkylsulfonyl, benzylsulfonyl, sulfamoyl, lower alkylsulfamoyl, cyanoethylsulfamoyl, hydroxyethylsulfamoyl, dilower alkylsulfamoyl, N,N-di(cyanoethyl)-sulfamoyl, N,N,-di(hydroxyethyl)sulfamoyl, phenylsulfamoyl, formamido, lower alkanoylamino, chloropropionamido, benzamido, lower alkylsulfonylamino, lower alkoxycarbonyl, benzyloxycarbonyl, lower alkoxycarbonylamino, carbamoyl, lower alkylcarbamoyl, dilower alkylcarbamoyl or phenylcarbamoyl,
F'' is phenyl, substituted phenyl having 1 or 2 substituents, naphthyl or methylsulfonylnaphthyl, wherein each substituent of substituted phenyl is independently chloro, bromo, lower alkyl, lower alkoxy, phenoxy, trifluoromethyl, thiocyano, cyano, nitro, hydroxy, formyl, acetyl, benzoyl, lower alkylsulfonyl, hydroxyethylsulfonyl, benzylsulfonyl, sulfamoyl, lower alkylsulfamoyl, cyanoethylsulfamoyl, hydroxyethylsulfamoyl, dilower alkylsulfamoyl, N,N-di(cyanoethyl)-sulfamoyl, N,N-di(hydroxyethyl)sulfamoyl, phenylsulfamoyl, lower alkylamino, cyanoethylamino, dilower alkylamino, N,N-di(cyanoethyl)amino, N-ethyl-N-cyanoethylamino, N,N-di(hydroxyethyl)-amino, formamido, lower alkanoylamino, chloropropionamido, benzamido, methylsulfonylamino, lower alkoxycarbonyl, benzyloxycarbonyl, lower alkoxycarbonylamino, carbamoyl, lower alkylcarbamoyl, dilower alkylcarbamoyl or phenylcarbamoyl.

$X_2$ is hydrogen, lower alkyl or monosubstituted lower alkyl, wherein the substituent of monosubstituted lower alkyl is chloro, bromo, hydroxy, cyano, lower alkanoyloxy, benzoyloxy, lower alkoxycarbonyloxy, lower alkoxycarbonyl, carbamoyl, benzyloxycarbonyloxy, lower alkoxy, phenoxy, phenyl, methylcarbamoyloxy or phenylcarbamoyloxy, Y is phenylene or substituted phenylene having 1 or 2 substituents, wherein each substituent of substituted phenylene is independently chloro, bromo, lower alkyl, lower alkoxy, formamido, lower alkanoylamino, benzamido, lower alkoxycarbonylamino, benzyloxycarbonylamino or chloropropionamido, $Y_3$ is phenyl or substituted phenyl having 1 or 2 substituents, wherein each substituent of substituted phenyl is independently chloro, bromo, lower alkyl, lower alkoxy, phenoxy, hydroxy, cyano, nitro, thiocyano, hydroxyethoxy, lower alkanoyloxyethoxy, formamido, lower alkanoylamino, benzamido, lower alkylsulfonyl, benzylsulfonyl, phenylsulfonyl, sulfamoyl, lower alkylsulfamoyl, dilower alkylsulfamoyl, acetyl, benzoyl, carbamoyl, lower alkylcarbamoyl, dilower alkylcarbamoyl or methoxypropylcarbamoyl, Z is phenyl or substituted phenyl having 1 or 2 substituents, wherein each substituent of substituted phenyl is independently chloro, bromo, lower alkyl, lower alkoxy, formamido, lower alkanoylamino, benzamido, lower alkoxycarbonylamino, benzyloxycarbonylamino or chloropropionamido, $Z_1$ is phenylene or monosubstituted phenylene, wherein the substituent of mono-substituted phenylene is chloro, bromo, lower alkyl, lower alkoxy, phenoxy, hydroxy, cyano, nitro, thiocyano, hydroxyethoxy, lower alkanoyloxyethoxy, formamido, lower alkanoylamino, benzamido, lower alkylsulfonyl, benzylsulfonyl, phenylsulfonyl, sulfamoyl, lower alkylsulfamoyl, acetyl, benzoyl, carbamoyl, lower alkylcarbamoyl or methoxypropylcarbamoyl, and p is 0 or 1.

2. A compound according to claim 1 having the formula

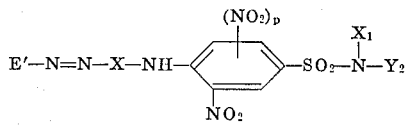

or

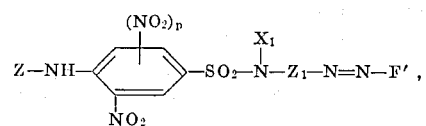

wherein
E' is phenyl, substituted phenyl having 1 or 2 substituents, naphthyl or methylsulfonylnaphthyl, wherein each substituent of substituted phenyl is independently chloro, bromo, lower alkyl, lower alkoxy, trifluoromethyl, nitro, cyano, thiocyano, phenoxy, formyl, acetyl, benzoyl, lower alkylsulfonyl, lower hydroxyalkylsulfonyl, benzylsulfonyl, sulfamoyl, methylsulfamoyl, cyanoethylsulfamoyl, hydroxyethylsulfamoyl, phenylsulfamoyl, formamido, lower alkanoylamino, chloropropionamido, lower alkylsulfonylamino, lower alkoxycarbonyl, benzyloxycarbonyl, lower alkoxycarbonylamino, carbamoyl, lower alkylcarbamoyl or phenylcarbamoyl, F' is phenyl, substituted phenyl having 1 or 2 substituents, naphthyl or methylsulfonylnaphthyl, wherein each substituent of substituted phenyl is independently chloro, bromo, lower alkyl, lower alkoxy, phenoxy, trifluoromethyl, thiocyano, cyano, nitro, hydroxy, formyl, acetyl, benzoyl, lower alkylsulfonyl, hydroxyethylsulfonyl, benzylsulfonyl, sulfamoyl, lower alkylsulfamoyl, cyanoethylsulfamoyl, hydroxyethylsulfamoyl, phenylsulfamoyl, lower alkylamino, cyanoethylamino, formamido, lower alkanoylamino, chloropropionamido, methylsulfonylamino, lower alkoxycarbonyl, benzyloxycarbonyl, lower alkoxycarbonylamino, carbamoyl, lower alkylcarbamoyl or phenylcarbamoyl, $X_1$ hydrogen, lower alkyl or monosubstituted lower alkyl, wherein the substituent of monosubstituted lower alkyl is chloro, bromo, hydroxy, cyano, lower alkanoyloxy, benzoyloxy, lower alkoxycarbonyloxy, lower alkoxycarbonyl, carbamoyl, benzyloxycarbonyloxy, lower alkoxy, phenoxy, methylcarbamoyloxy or phenylcarbamoyloxy, Y is phenylene or substituted phenylene having 1 or 2 substituents, wherein each substituent of substituted phenylene is independently chloro, bromo, lower alkyl, lower alkoxy, formamido, lower alkanoylamino, benzamido, lower alkoxycarbonylamino, benzyloxycarbonylamino or chloropropionamido, $Y_2$ is phenyl or substituted phenyl having 1 or 2 substituents, wherein each substituent of substituted phenyl is independently chloro, bromo, lower alkyl, lower alkoxy, phenoxy, hydroxy, cyano, nitro, thiocyano, hydroxyethoxy, lower alkanoyloxyethoxy, formamido, lower alkanoylamino, benzamido, lower alkylsulfonyl, benzylsulfonyl, phenylsulfonyl, sulfamoyl, lower alkylsulfamoyl, acetyl, benzoyl, carbamoyl, lower alkylcarbamoyl or methoxypropylcarbamoyl, Z is phenyl or substituted phenyl having 1 or 2 substituents, wherein each substituent of substituted phenyl is independently chloro, bromo, lower alkyl, lower alkoxy, formamido, lower alkanoylamino, benzamido, lower alkoxycarbonylamino, benzyloxycarbonylamino or chloropropionamido, $Z_1$ is phenylene or monosubstituted phenylene, wherein the substituent of monosubstituted phenylene is chloro, bromo, lower alkyl, lower alkoxy, phenoxy, hydroxy, cyano, nitro, thiocyano, hydroxyethoxy, lower alkanoyloxyethoxy, formamido, lower alkanoylamino, benzamido, lower alkylsulfonyl, benzylsulfonyl, phenysulfonyl, sulfamoyl, lower alkylsulfamoyl, acetyl, benzoyl, carbamoyl, lower alkylcarbamoyl or methoxypropylcarbamoyl, and p is 0 or 1.

3. A compound according to claim 1
wherein
E'' is phenyl or substituted phenyl having 1 or 2 substituents, wherein each substituent of substituted phenyl is independently chloro, bromo, lower alkyl, lower alkoxy, trifluoromethyl, cyano, thiocyano, phenoxy, formyl, acetyl, benzoyl, lower alkylsulfonyl, lower hydroxyalkylsulfonyl, benzylsulfonyl, sulfamoyl, lower alkylsulfamoyl, cyanoethylsulfamoyl, hydroxyethylsulfamoyl, dilower alkylsulfamoyl, N,N-di(cyanoethyl)sulfamoyl, N,N-di(hydroxyethylsulfamoyl, phenylsulfamoyl, formamido, lower alkanoylamino, chloropropionamido, benzamido, lower alkylsulfonylamino, lower alkoxycarbonyl, benzyloxycarbonyl, lower alkoxycarbonylamino, carbamoyl, lower alkylcarbamoyl, dilower alkylcarbamoyl or phenylcarbamoyl, and F'' is phenyl or substituted phenyl having 1 or 2 substituents, wherein each substituent of substituted phenyl is independently chloro, bromo, lower alkyl, lower alkoxy, phenoxy, trifluoromethyl, thiocyano, cyano, hydroxy, formyl, acetyl, benzoyl, lower alkylsulfonyl, hydroxyethylsulfonyl, benzylsulfonyl, sulfamoyl, lower alkylsulfamoyl, cyanoethylsulfamoyl, hydroxyethylsulfamoyl, dilower alkylsulfamoyl, N,N-di(cyanoethyl)sulfamoyl, N,N-di(hydroxyethyl)sulfamoyl, phenylsulfamoyl, lower alkylamino, cyanoethylamino, dilower alkylamino, N,N-di(cyanoethyl)amino, N-ethyl-N-cyanoethylamino, N,N-di(hydroxyethyl)amino, formamido, lower alkanoylamino, chloropropionamido, benzamido, methylsulfonylamino, lower alkoxycarbonyl, benzyloxycarbonyl, lower alkoxycarbonylamino, carbamoyl, lower alkylcarbamoyl, dilower alkylcarbamoyl or phenylcarbamoyl.

4. A compound according to claim 1 having the formula

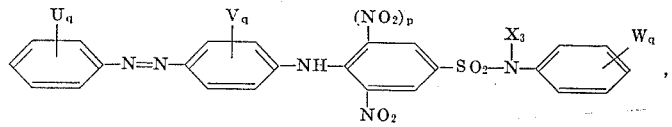

wherein
each U is independently chloro, bromo, lower alkyl, lower alkoxy, trifluoromethyl, nitro, cyano, thiocyano, phenoxy, formyl, acetyl, lower alkylsulfonyl, lower hydroxyalkylsulfonyl, benzylsulfonyl, sulfamoyl, lower alkylsulfamoyl, cyanoethylsulfamoyl, hydroxyethylsulfamoyl, N,N-dilower alkylsulfamoyl, N,N-di(cyanoethyl)sulfamoyl, N,N-di(hydroxyethyl)sulfamoyl, phenylsulfamoyl, formamido, lower alkanoylamino, chloropropionamido, benzamido, lower alkylsulfonylamino, lower alkoxycarbonyl, benzyloxycarbonyl, lower alkoxycarbonylamino, carbamoyl, lower alkylcarbamoyl, dilower alkylcarbamoyl or phenylcarbamoyl, each V is independently chloro, lower alkyl, lower alkoxy, formamido or lower alkanoylamino, each W is independently chloro, bromo, lower alkyl, lower alkoxy, phenoxy, hydroxy, cyano, nitro, thiocyano, hydroxyethoxy, lower alkanoyloxyethoxy, lower alkanoylamino, lower alkylsulfonyl, benzylsulfonyl, phenylsulfonyl, sulfamoyl, dilower alkylsulfamoyl, acetyl, benzoyl, carbamoyl, lower alkylcarbamoyl, dilower alkylcarbamoyl or methoxypropylcarbamoyl, $X_3$ is hydrogen, lower alkyl or monosubstituted lower alkyl, wherein the substituent of monosubstituted lower alkyl is chloro, hydroxy, cyano, lower alkanoyloxy, benzoyloxy, lower alkoxycarbonyloxy, lower alkoxycarbonyl, carbamoyl, benzyloxycarbonyloxy, lower alkoxy, phenoxy or phenyl, p is 0 or 1, and
each q is independently 0, 1 or 2.

5. A compound according to claim 4 having the formula

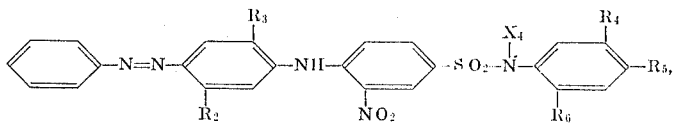

wherein
$R_2$ is hydrogen, chloro, methyl or methoxy,
$R_3$ is hydrogen, methyl or methoxy,
$R_4$ is hydrogen, chloro, bromo, methyl or methoxy,
$R_5$ is hydrogen, chloro, bromo, methyl, methoxy or ethoxy,
$R_6$ is hydrogen, chloro, bromo, methyl, ethyl or methoxy, and
$X_4$ is hydrogen, methyl or ethyl.

6. A compound according to claim 4 having the formula

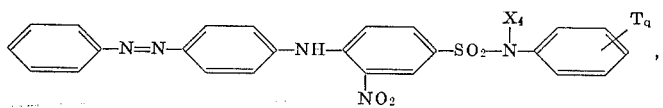

wherein each T is independently chloro, methyl or methoxy,
$X_4$ is hydrogen, methyl or ethyl, and
q is 0, 1 or 2.

7. The compound according to claim 6 having the formula

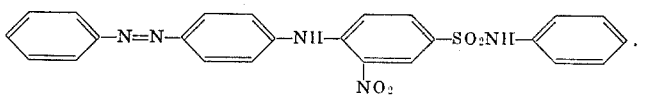

12. The compound according to claim 6 having the formula

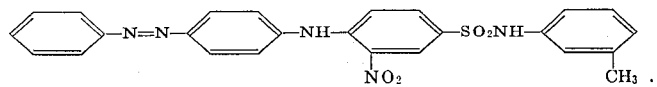

8. The compound according to claim 6 having the formula

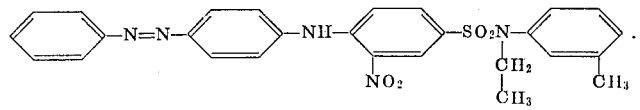

13. The compound according to claim 6 having the formula

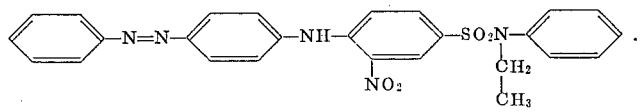

9. The compound according to claim 6 having the formula

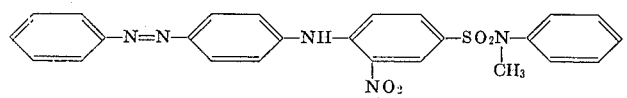

14. A compound according to claim 1 having the formula

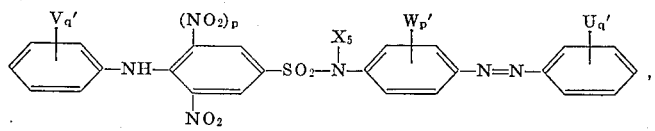

wherein
U' is independently chloro, bromo, lower alkyl, lower

10. The compound according to claim 6 having the formula

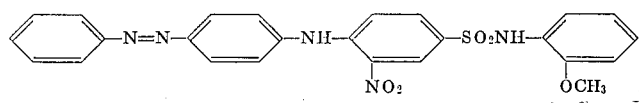

11. The compound according to claim 6 having the formula

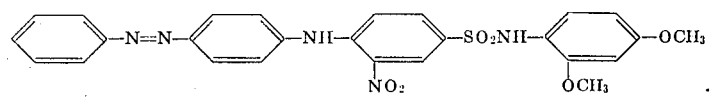

alkoxy, phenoxy, trifluoromethyl, thiocyano, cyano, nitro, hydroxy, formyl, acetyl, benzoyl, lower alkylsulfonyl, hydroxyethylsulfonyl, benzylsulfonyl, sulfamoyl, lower alkylsulfamoyl, cyanoethylsulfamoyl, hydroxyethylsulfamoyl, dilower alkylsulfamoyl, N,N-di(cyanoethyl)sulfamoyl, N,N-di(hydroxyethyl)sulfamoyl, phenylsulfamoyl, dilower alkylamino, N,N-di(cyanoethyl)amino, N-ethyl-N-cyanoethylamino N,N-di(hydroxyethyl)amino, formamido, lower alkanoylamino, chloropropionamido, benzamido, methylsulfonylamino, lower alkoxycarbonyl, benzyloxycarbonyl, lower alkoxycarbonylamino, carbamoyl, lower alkylcarbamoyl, dilower alkylcarbamoyl or phenylcarbamoyl, each V' is independently chloro, bromo, lower alkyl, benzamido, lower alkoxycarbonylamino, benzyloxycarbonylamino or chloropropionamido, W' is lower alkyl, lower alkoxy, formamido or benzamido, $X_5$ is hydrogen, lower alkyl or monosubstituted lower alkyl, wherein the substituent of monosubstituted lower alkyl is lower alkanoyloxy, benzoyloxy or lower alkoxy, each p is independently 0 or 1, and each q is independently 0, 1 or 2.

15. The compound according to claim 14 having the formula

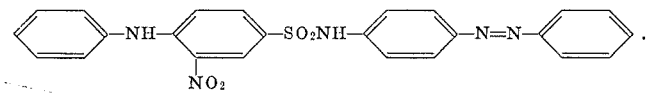

* * * * *